E. CHRISTENSEN.
SAFETY REVERSIBLE FLOOR CONVEYER.
APPLICATION FILED JAN. 7, 1918.
1,282,379.
Patented Oct. 22, 1918.
2 SHEETS—SHEET 1.
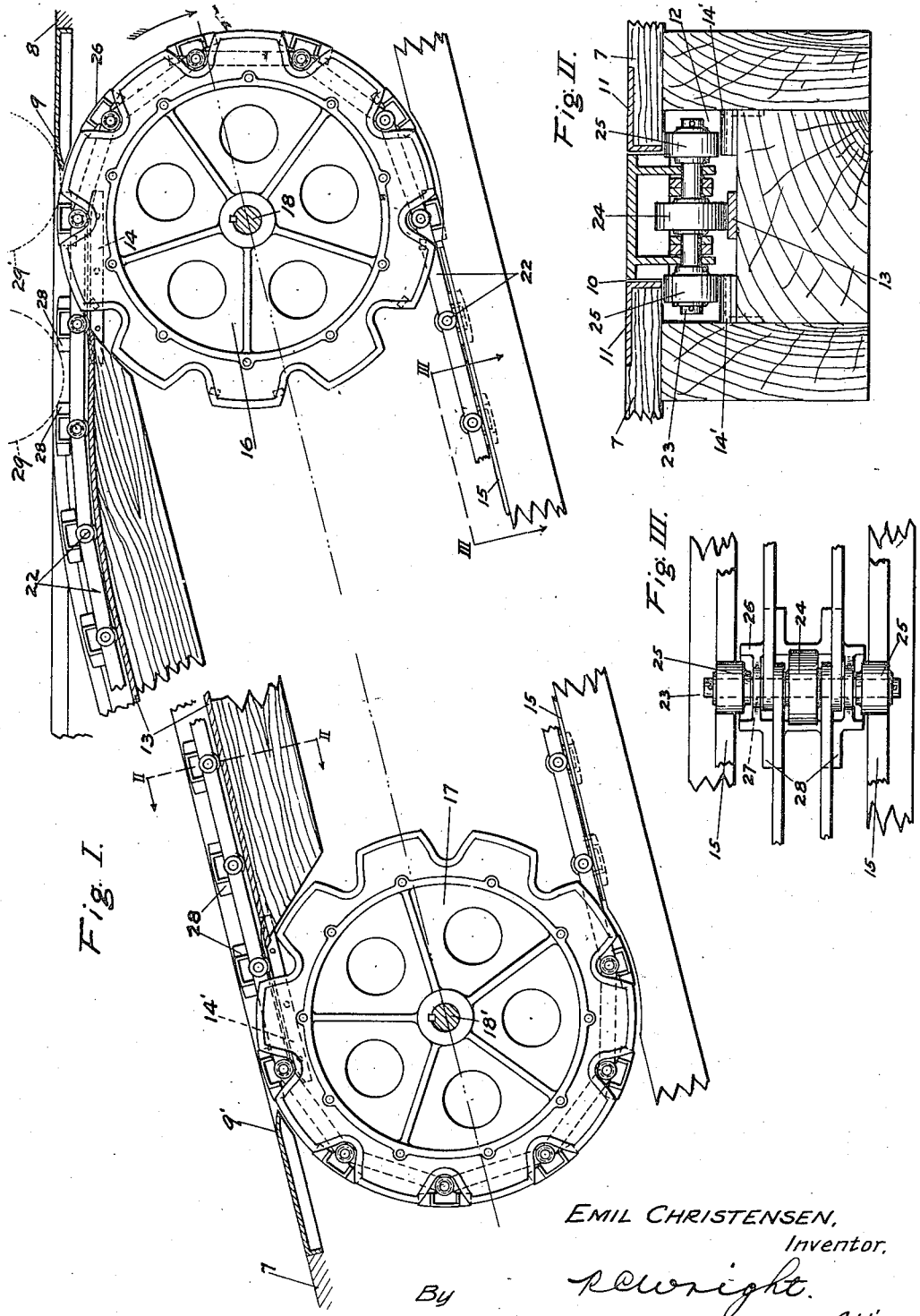
EMIL CHRISTENSEN,
Inventor,
By R. C. Wright.
Atty.

E. CHRISTENSEN.
SAFETY REVERSIBLE FLOOR CONVEYER.
APPLICATION FILED JAN. 7, 1918.
1,282,379.
Patented Oct. 22, 1918.
2 SHEETS—SHEET 2.
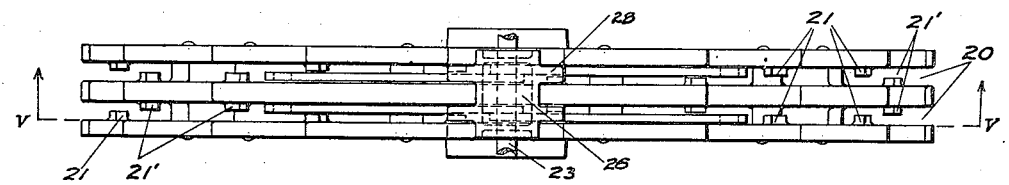
Fig. IV.
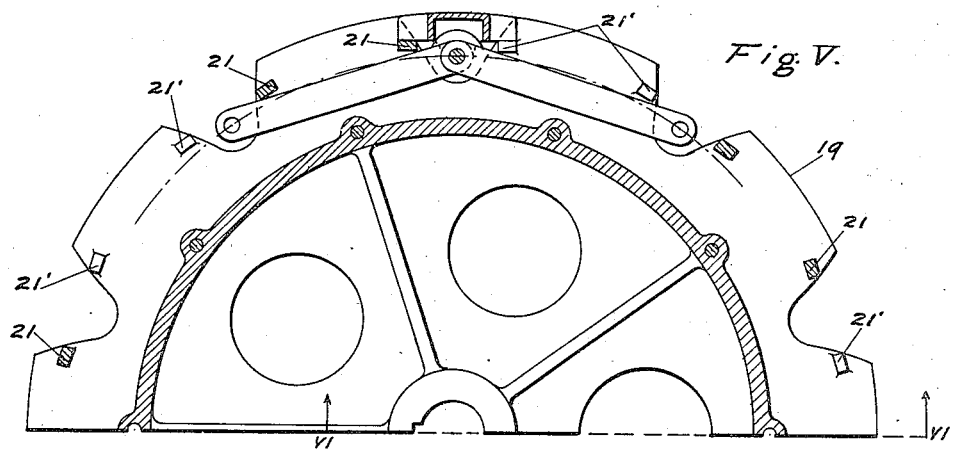
Fig. V.
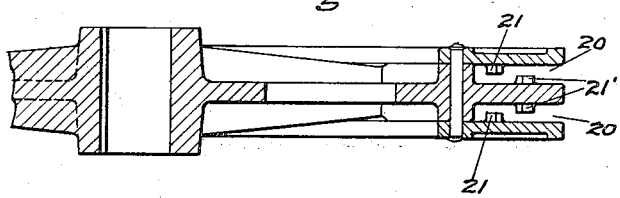
Fig. VI.
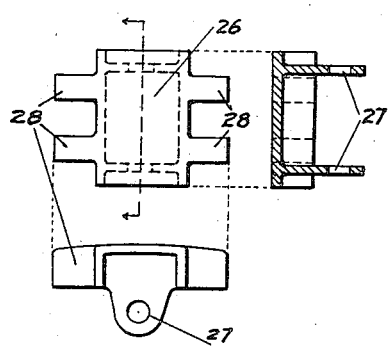
Fig. VII.
EMIL CHRISTENSEN,
Inventor,
By R. C. Wright.
Atty.

UNITED STATES PATENT OFFICE.

EMIL CHRISTENSEN, OF PORTLAND, OREGON.

SAFETY REVERSIBLE FLOOR CONVEYER.

1,282,379.

Specification of Letters Patent.   Patented Oct. 22, 1918.

Application filed January 7, 1918. Serial No. 210,717.

*To all whom it may concern:*

Be it known that I, EMIL CHRISTENSEN, a citizen of the United States, residing at Portland, in the county of Multnomah, State of Oregon, have invented a new and useful Improvement in Safety Reversible Floor Conveyers, of which the following is a specification, reference being had to the accompanying drawings.

My invention relates to a class of devices employed for conveying hand trucks on inclined surfaces.

The objects of my invention are to provide a sprocket chain system conveyer, so arranged that parts thereof will engage the wheels of a hand truck in such a manner that the truck may be conveyed up or down an incline in a practical way and with entire safety to the operator. I accomplish these objects, as well as others, by the construction, combination and arrangement of parts illustrated in the drawings which form a part hereof.

Figure I is a side elevation of the device with intermediate parts broken away.

Fig. II is a cross section of the sprocket chain and adjacent parts on the line II—II of Fig. I.

Fig. III is a plan view of chain and adjacent parts on the line III—III of Fig. I.

Fig. IV is a plan view of a sprocket with a flight and adjacent links in place.

Fig. V is a section of a half sprocket wheel on line V—V of Fig. IV.

Fig. VI is a radial section of a sprocket wheel on the line VI—VI of Fig. V.

Fig. VII is a detail plan view of link flight with half section and end elevation in projections.

Like numerals refer to like parts throughout the views.

A floor incline 7 and horizontal floor 8 are indicated in Fig. I. The floor, at the ends of the longitudinal openings or channels therein and above and below the respective sprocket wheels, has curved sections 9—9'. Between these sections is a longitudinal opening 10 in the floor, of suitable width. The shoulders of the floor on each side of the opening are protected by angled sheathing extending longitudinally along them. In and below this opening my conveyer system is arranged. It will be primarily understood that a like space, floor arrangement and system are placed parallel with the one indicated, each being adapted to simultaneously engage one wheel of the transverse shaft of a hand truck, and thus convey the truck. Thus the illustration and description is intended to apply to each of the parallel systems, etc., without duplicating identical construction and arrangement in the drawings.

Below the surface of the floor and the opening 10 is a channel 12, open at each end and extending between the sprocket wheels hereinafter described. A track 13 extends longitudinally along the bottom of the channel. On the upper and lower ends of the channel 12 and on each side of said ends are the respective free angle supports 14—14' which terminate a suitable distance beyond the channel ends. At a suitable distance below the floor, and vertically beneath the channel 12, are parallel tracks 15, in alinement with the respective sides of the channel.

An upper sprocket wheel 16 and a lower sprocket wheel 17 are secured on transverse shafts 18—18'. The sprockets 16 and 17 extend upwardly within the respective spaces between the channel ends and floor sections 9—9' also between the respective angle supports 14—14 and 14'—14'. The sprockets likewise extend downwardly between the tracks 15 and have teeth 19. Power may be transmitted from any convenient source to the shaft 18, and to the shaft 18' if desired. The sprockets 16 and 17 are formed with parallel annular chain grooves 20 in their peripheries. Within and on each side of the grooves, and integral with the teeth, are arranged series of alternating lugs 21—21' at a suitable height within the grooves. A sprocket chain 22 is provided which extends completely about and connects the sprockets 16 and 17. Each link connection of this chain has a pin 23 which extends a little beyond the outer link bars at each side of the connection. In the middle of the pin a small carrying wheel 24 is rotatably mounted between the bars of the links. On each end of the pin 23 is rotatably mounted a small wheel 25 of less diameter than the wheel 24. The pin also extends through bearings 27 of a flight 26 provided at each link connection. The flight 26 has its bearings adjacent to the inner sides of the wheels 25. The flight has in its front and rear parallel curved supporting lugs 28. The wheels 25 engage the lower surface of the floor 7 and also engage the angle supports 14—14' while traveling across the respective spaces between the floor and channel ends. The flights 26 travel between the lower tracks 15 and through the opening 10 and channel 12. In their passage the lower parts of the flight lugs 28 engage below them the alternating lugs 21—21' in the respective grooves of the sprockets. A truck wheel 29 is shown in operative position near the upper end of the incline, being carried forward in engagement with preceding and following flights 26. The same truck wheel is further shown in dotted lines at 29' where it is about to leave the last engaging flight and pass upon the level floor 8.

It will now be seen that the operator moves a hand truck upon and over the parallel sprocket chain system while in motion and the wheels on each side of the truck are engaged by the flights 26 as shown by wheel 29 of Fig. I. Thereupon the truck is carried upward or downward according to the direction of the chain travel. As the truck approaches the curved floor section 9 in its upward travel the truck wheels pass easily over the rounded floor sections, and upon the floor 8. In a similar way the truck wheels pass from or upon the curved lower inclined floor sections 9. It will be noted that the flights are adapted in form to engage the truck wheels as described. The sprocket lugs retain the flights in an even bearing over the carrying wheels 24. The side wheels prevent the flights or chain from tilting by engaging the lower surface of the floor as shown. The above arrangement insures a practically even running surface over the wheel and chain and requires very little clearance as the chain passes below the floor.

It will be seen that the construction and arrangement makes the device particularly safe for the operator. The flights travel practically in line with the floor plane and fill the opening 10. As the chain passes around the sprocket wheel, noting especially now the upper one because of the illustrated chain travel, it will be observed that the sprocket teeth and the flights, supported by the groove lugs, form a practically complete transverse surface across the uppermost parts of the sprocket while entering the space between the channel end and the floor end. This necessarily provides an arrangement whereby any object such as the human foot, or a truck wheel, will be at once raised or forced out of the space and carried over upon the floor beyond. Therein lies the peculiar safety feature of my device, which is a novel arrangement. It will be observed further that while the chain is traveling in the channel the weight is carried on the center wheels 24 and the end wheels 25 engaging the floor shoulders prevent tilting. The end wheels also carry the weight across the space occupied by the sprockets as the end wheels then travel on the angle supports 14—14'. It will likewise be seen that the weight of the chain and other parts is carried by the end wheels 25 when the chain travels between the lower tracks 15, which takes considerable weight and strain from the sprockets. The end wheels 25 are further important in that they prevent the chain from rising or buckling when it travels in the reverse direction to that indicated, otherwise the upper part of the chain would be slack and would rise above the floor upon meeting any resistance. It will of course be understood that the chain travel is reversible, in order that loaded trucks may be conveyed down the incline as well as up the same. While I have shown an inclined floor, it is apparent that the device is adaptable to a level floor and to conveying other objects besides trucks in either form.

Having described my invention, I claim—

1. A conveyer device of the character described, having in combination, a floor provided with a longitudinal channel, sprocket wheels rotatably mounted below and at each end of the channel, extending upwardly within the channel lines, said sprocket wheels being formed with parallel annular chain grooves in their peripheries and a series of alternating lugs at a suitable height in the grooves, an endless sprocket chain extending around and connecting said sprocket wheels and arranged to travel through the channel, central carrying wheels rotatably mounted on the chain pivots and arranged to travel on the bottom of the channel, side wheels rotatably mounted on each end of the carrying wheel pivots and arranged to travel in the channel below the adjacent floor in engagement with its lower surface, and flights mounted on the wheel pivots, said flights having forward and rear supporting lugs adapted to engage the sprocket wheel lugs during chain travel and also being arranged to engage and support between them the wheel of a truck and to allow said truck wheel to engage the adjacent rim of the sprocket wheel and be raised thereby to a plane even with that of the floor at the end of the channel, substantially as described.

2. A conveyer device of the character described, having in combination, a floor provided with a longitudinal channel, sprocket wheels rotatably mounted below and at each end of the channel, extending upwardly within the channel lines, said sprocket wheels being formed with parallel annular chain grooves in their peripheries and a series of alternating lugs at a suitable height in the grooves, an endless sprocket chain extending around and connecting said sprocket wheels and arranged to travel through the channel, central carrying wheels rotatably mounted on the chain pivots and arranged to travel on the bottom of the channel, side wheels rotatably mounted on each end of the carrying wheel pivots and arranged to travel in the channel below the adjacent floor in engagement with its lower surface, flights mounted on the wheel pivots, said flights having forward and rear supporting lugs adapted to engage the sprocket wheel lugs during the chain travel and also being arranged to engage and support between them the wheel of a truck and to allow said truck wheel to engage the adjacent rim of the sprocket wheel and be raised thereby to a plane even with that of the floor at the end of the channel, and a frame arranged below the floor channel, provided with tracks in position to support the chain side wheels in travel, also having a space between the tracks to allow free passage of the chain carrying wheels, substantially as described.

3. In a conveyer device of the character described, the combination of sprocket wheels formed with parallel annular chain grooves in their peripheries and a series of alternating lugs at a suitable height in the grooves, an endless sprocket chain extending around and connecting said sprocket wheels, and flights mounted on the chain pivots, said flights having forward and rear supporting lugs adapted to engage the sprocket wheel lugs during the chain travel, also being arranged to engage and support between them the wheel of a truck and to allow said truck wheel to engage the adjacent rim of the sprocket wheel and be raised thereby to a place even with that of said rim when in its highest position, substantially as described.

EMIL CHRISTENSEN.

Witnesses:
 DELIA SMITH WRIGHT,
 R. B. POTTS.